United States Patent [19]
Cimmino

[11] Patent Number: 5,829,816
[45] Date of Patent: Nov. 3, 1998

[54] VISOR ATTACHMENT

[76] Inventor: James Cimmino, 36038 Ravello Ct., Murrieta, Calif. 92562

[21] Appl. No.: 834,999

[22] Filed: Apr. 7, 1997

[51] Int. Cl.⁶ ........................................................ B60J 3/50
[52] U.S. Cl. ...................... 296/97.6; 296/97.8; 296/97.11
[58] Field of Search .................................. 296/97.6, 97.8, 296/97.11, 97.12, 97.13

[56] References Cited

U.S. PATENT DOCUMENTS

| | | | |
|---|---|---|---|
| 2,831,726 | 4/1958 | Ralston | 296/97.6 |
| 3,158,396 | 11/1964 | Berger | 296/97.6 |
| 3,522,968 | 8/1970 | Honor, Sr. | 296/97.6 |
| 3,954,297 | 5/1976 | Linke et al. | 296/97.6 |
| 3,988,033 | 10/1976 | Vacha | 296/97.6 |
| 4,736,979 | 4/1988 | Harvey | 296/97.6 |
| 5,040,840 | 8/1991 | Kokeisl | 296/97.6 |
| 5,306,065 | 4/1994 | Ades | 296/97.6 |
| 5,478,131 | 12/1995 | Marks | 296/97.6 |
| 5,484,183 | 1/1996 | Rosa | 296/97.6 |
| 5,611,591 | 3/1997 | Van Devender | 296/97.6 |

FOREIGN PATENT DOCUMENTS

| | | | |
|---|---|---|---|
| 889742 | 1/1972 | Canada | 296/97.6 |

Primary Examiner—Joseph D. Pape
Attorney, Agent, or Firm—James E. Brunton

[57] ABSTRACT

A vehicle sun visor attachment which includes a glare shield that can be adjusted transversely of the vehicle and can also be pivoted downwardly to increase the effective width of the sun visor. In one form of the invention, the glare shield can also be adjusted to effectively block light rays entering the vehicle side windows.

17 Claims, 9 Drawing Sheets

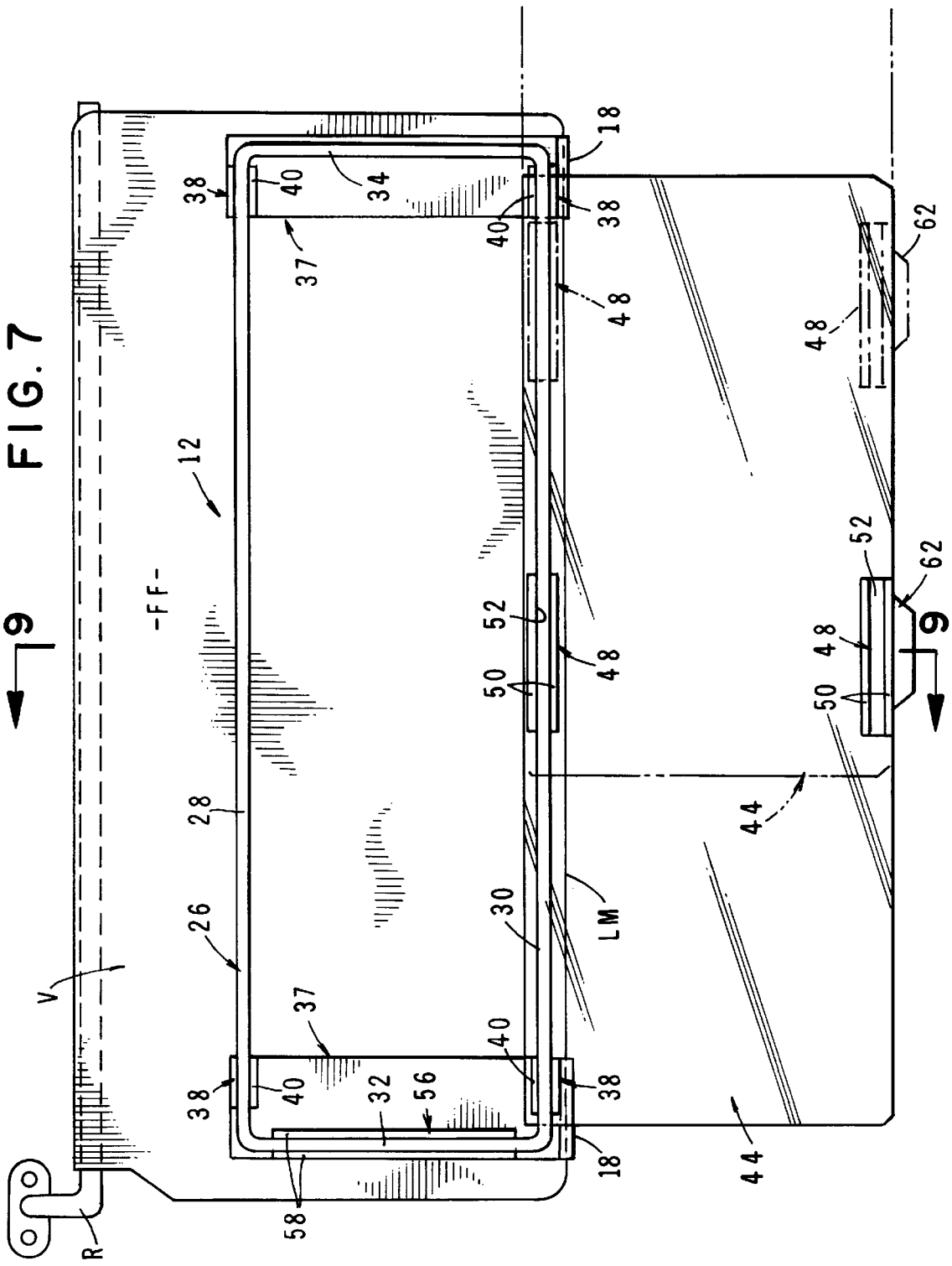

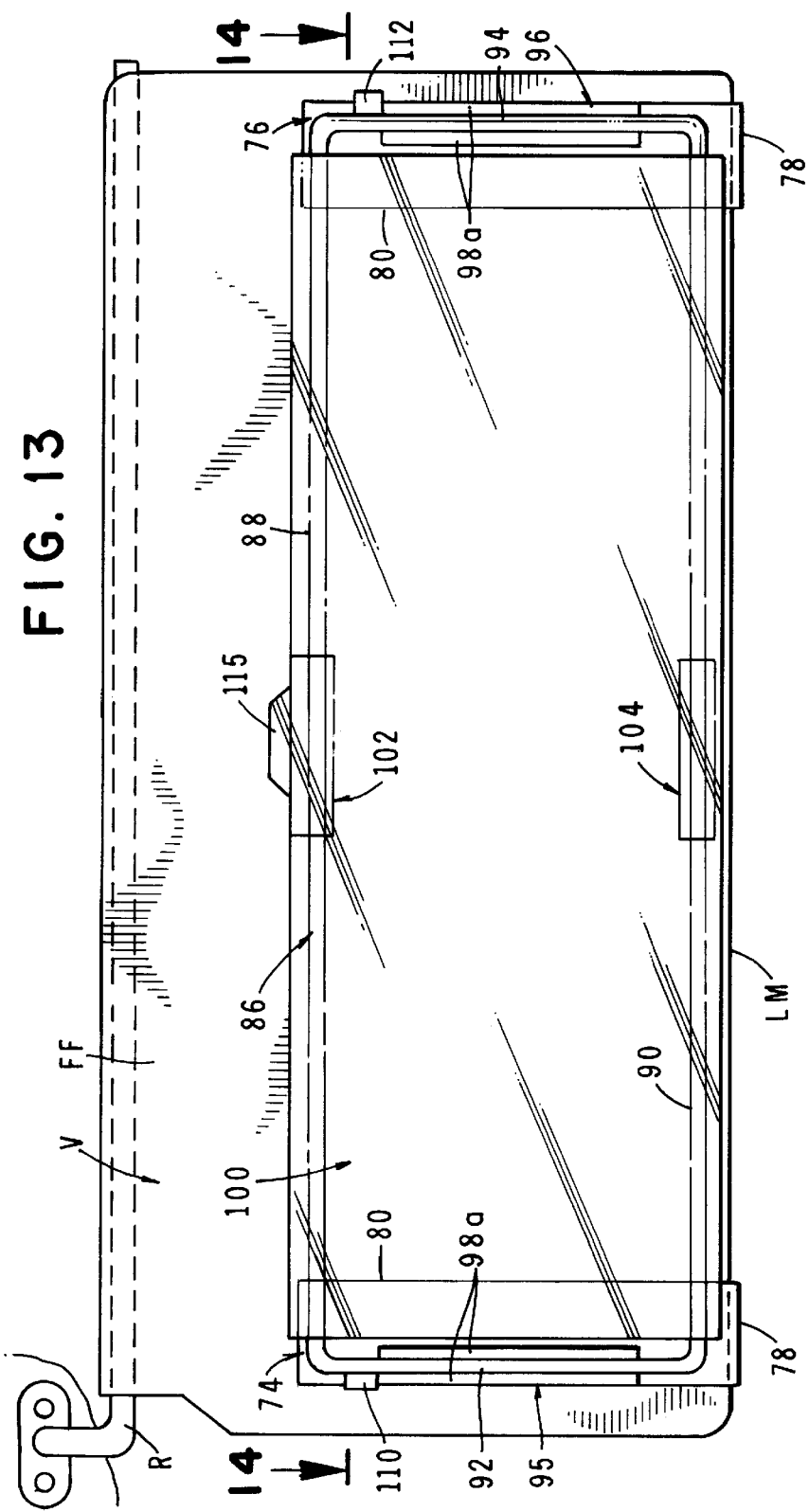

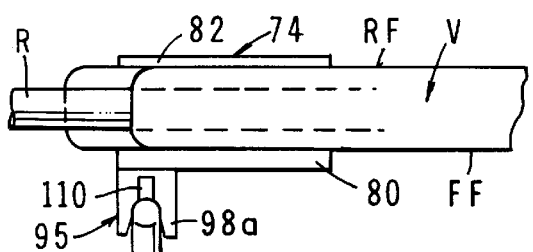
FIG. 15
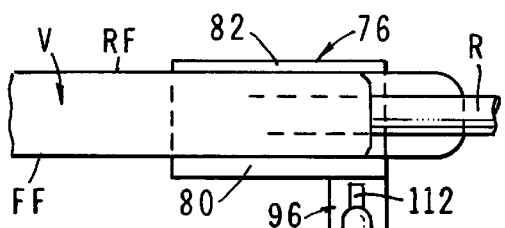
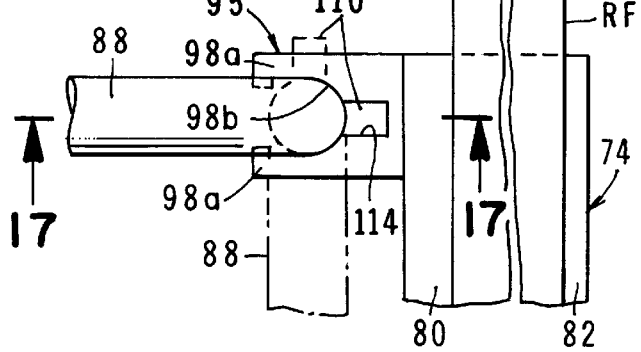
FIG. 16
FIG. 19
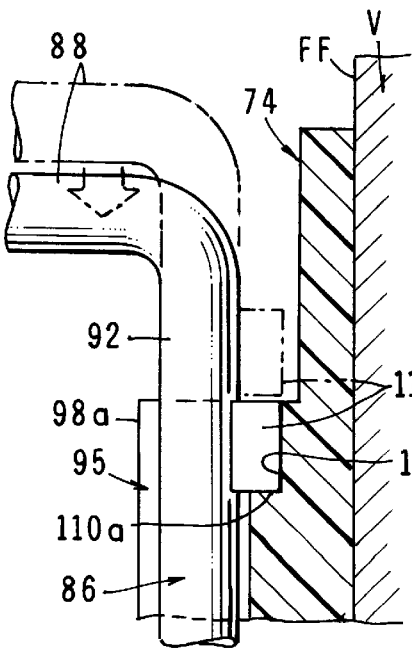
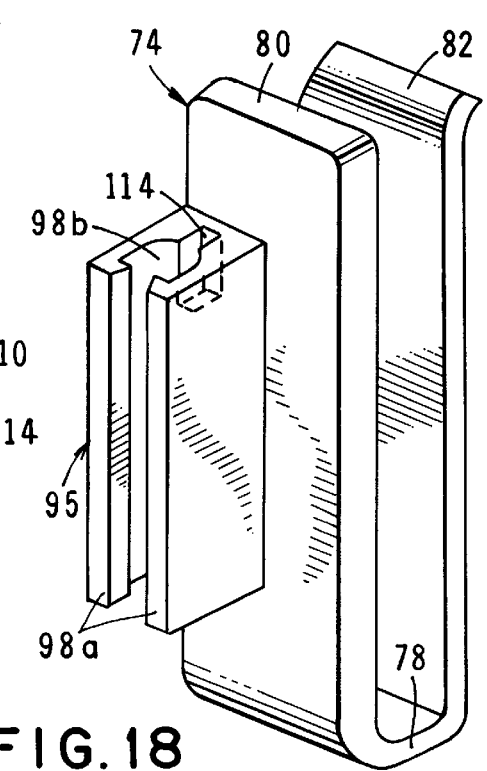
FIG. 17
FIG. 18

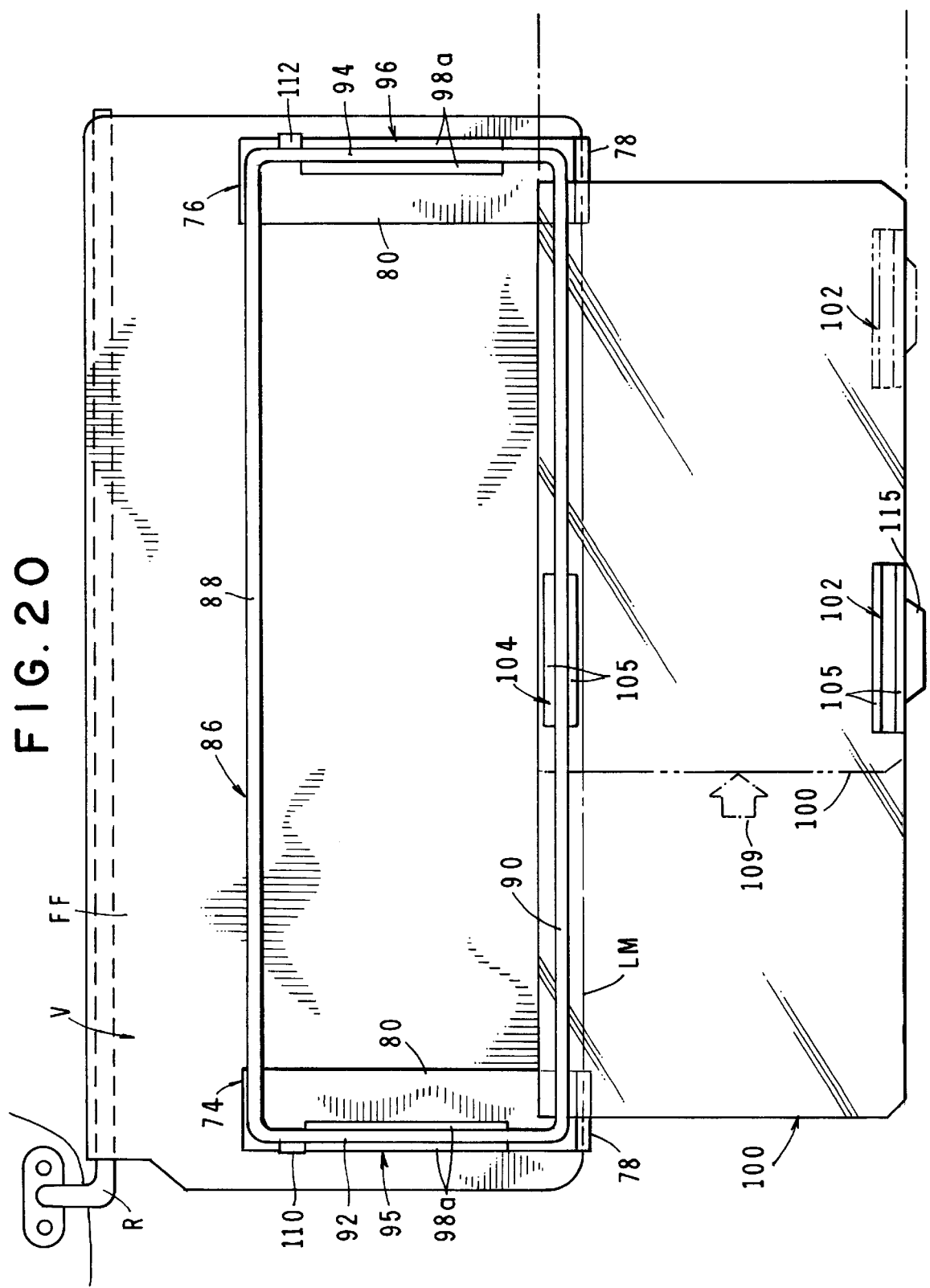

VISOR ATTACHMENT

BACKGROUND OF THE INVENTION

1. Field of the Invention

The present invention relates generally to attachments for sun visors for automobile, trucks and other motor vehicles. More particularly, the invention concerns a multiple position, adjustable sun visor attachment which includes a glare shield that can readily be adjusted transversely of the vehicle and can also be pivoted downwardly to increase the effective height of the sun visor. In one form of the invention, the glare shield can also be pivoted relative to the sun visor to shield the driver from rays of the sun entering the driver's side window.

2. Discussion of the Invention

In the past, a number of sun visor attachments have been devised that can be attached to the vehicle sun visor to intercept light rays which interfere with the driver's vision. For example, U.S. Pat. No. 4,982,992 issued to Vu, et al, discloses a glare shield which can be clipped onto a sun visor using alligator clips. A rod, which extends between the alligator clips, is provided with a track adapted to slidably receive the head of a bracket to which the shield is pivotally connected. U.S. Pat. No. 2,941,839 issued to Pendlebury also discloses a glare shield which can be adjustably interconnected with a vehicle sun visor. The U.S. Patent to Hildebrand, U.S. Pat. No. 4,248,423 describes a sun shade auxiliary device which is slidably supported by the vehicle sun visor. Other types of glare shields are described in U.S. Pat. No. 3,159,421 issued to Samuelson, U.S. Pat. No. 3,336,073 issued to Berger, and in U.S. Pat. No. 3,499,679 issued to Olander.

Unlike the prior art devices, the sun visor attachment of the present invention provides an easy-to-use glare shield attachment that can be slidably adjusted transversely, of the vehicle, to block sun rays entering the windshield of the vehicle at an angle between the driver side and passenger side sun visors. In one form of the invention, the glare shield can also be pivoted up and down relative to the visor and, additionally, the glare shield can be pivoted to a position generally parallel with the vehicle side window to provide a much greater range of sun protection.

The visor attachment of the invention can be used with any standard vehicle visor and can be quickly attached thereto without the need for any type of hand tools.

SUMMARY OF THE INVENTION

It is an object of the present invention to provide a sun visor attachment for use in motor vehicles which can be easily affixed to a vehicle sun visor and can quickly be adjusted to block light rays entering the vehicle windshield proximate the upper and lower central portion thereof as well as light rays entering the vehicle through the driver's side window.

Another object of the invention is to provide a sun visor attachment of the aforementioned character in which the glare shield of the attachment can be slidably moved toward the center of the vehicle.

Another object of the invention is to provide a sun visor attachment in which the glare shield of the assembly is also pivotally movable upwardly and downwardly about the axis of one of the rods along which the shield assembly slides from side to side.

Still another object of the invention is to provide a sun visor attachment as described in the preceding paragraphs in which the glare shield is pivotally movable relative to one side of the vehicle visor to a position wherein it is substantially perpendicular to the plane of the vehicle visor.

Another object of the invention is to provide a visor assembly of the class described in which the glare shield slides along a pair of elongated rods which span a pair of generally "U" shaped spring clip assemblies which frictionally engage the vehicle visor at longitudinally spaced-apart locations.

Still another object of the invention is to provide a sun visor attachment as described in the preceding paragraphs which is of simple construction, has a minimum number of parts, is easy to use and is inexpensive to manufacture.

These and other objects of the invention will be realized by the sun visor attachment of the present invention, the details of which are described in greater detail in the paragraphs which follow.

BRIEF DESCRIPTION OF THE DRAWINGS

FIG. 3 is a cross-sectional view taken along lines 3—3 of FIG. 1.

FIG. 7 is a front elevational view similar to FIG. 1 but showing the glare shield pivoted into a downwardly extending position and showing in phantom lines sliding movement of the glare shield to the right along visor-supporting guide rods which are removable affixed to the visor clip assemblies of the invention.

FIG. 13 is a front view of the alternate form of the invention shown in an assembled configuration.

FIG. 14 is a cross-sectional view taken along lines 14—14 of FIG. 13.

FIG. 15 is a fragmentary, plan view showing the shield component of the driver's side visor attachment pivoted to a position proximate the driver's side window.

FIG. 16 is an enlarged, fragmentary view illustrating the position of the locking means of the apparatus when the shield component has been pivoted into the position shown in FIG. 15.

FIG. 17 is an enlarged, cross-sectional view taken along lines 17—17 of FIG. 16 showing the shield component in a downward locked position.

FIG. 18 is a generally enlarged, generally perspective view of the left-hand visor clip portion of the apparatus.

FIG. 19 is a fragmentary, top plan view of the passenger side visor attachment showing the shield component pivoted into a position proximate the passenger's side window.

FIG. 20 is a front view similar to FIG. 13 but showing the glare shield pivoted into a downward position.

DESCRIPTION OF THE INVENTION

Figure 1:
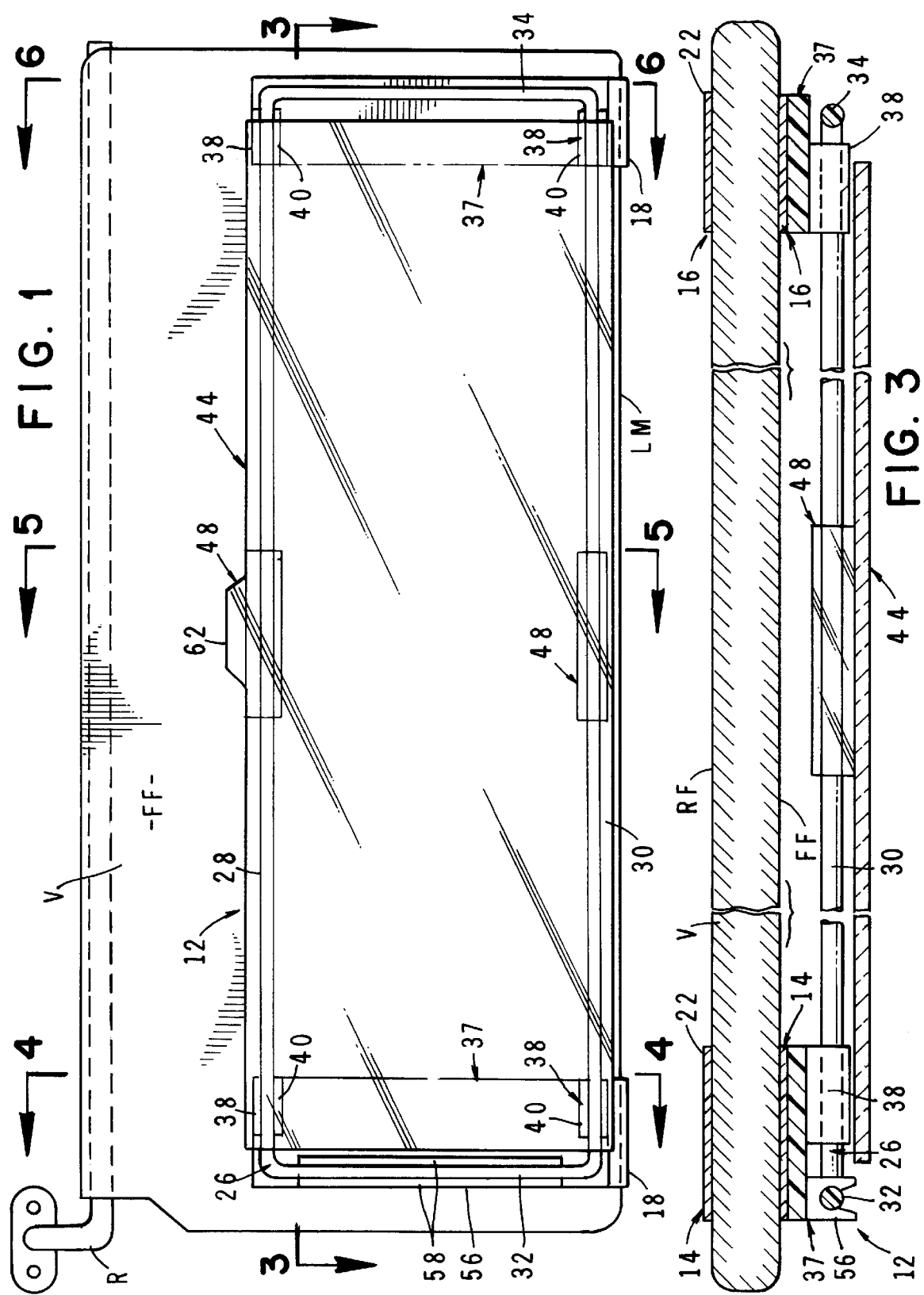
FIG. 1 is a front view of one form of the adjustable sun visor attachment of the invention shown attached to a vehicle sun visor.

Referring to the drawings and particularly to FIGS. 1 through 6, one form of the sun visor attachment of the present invention is there illustrated and generally identified by the numeral 12. In this embodiment of the invention, the attachment comprises an assembly made up of a pair of generally "U" shaped spring clips 14 and 16 which are removably receivable over the vehicle visor "V" at longitudinally spaced first and second locations (FIGS. 1 and 3). As shown in FIG. 1, visor "V" is supported by a support rod "R" which is affixed to the vehicle so that the visor can be pivotally moved upwardly and downwardly about the axis of rod "R".

Figure 2:
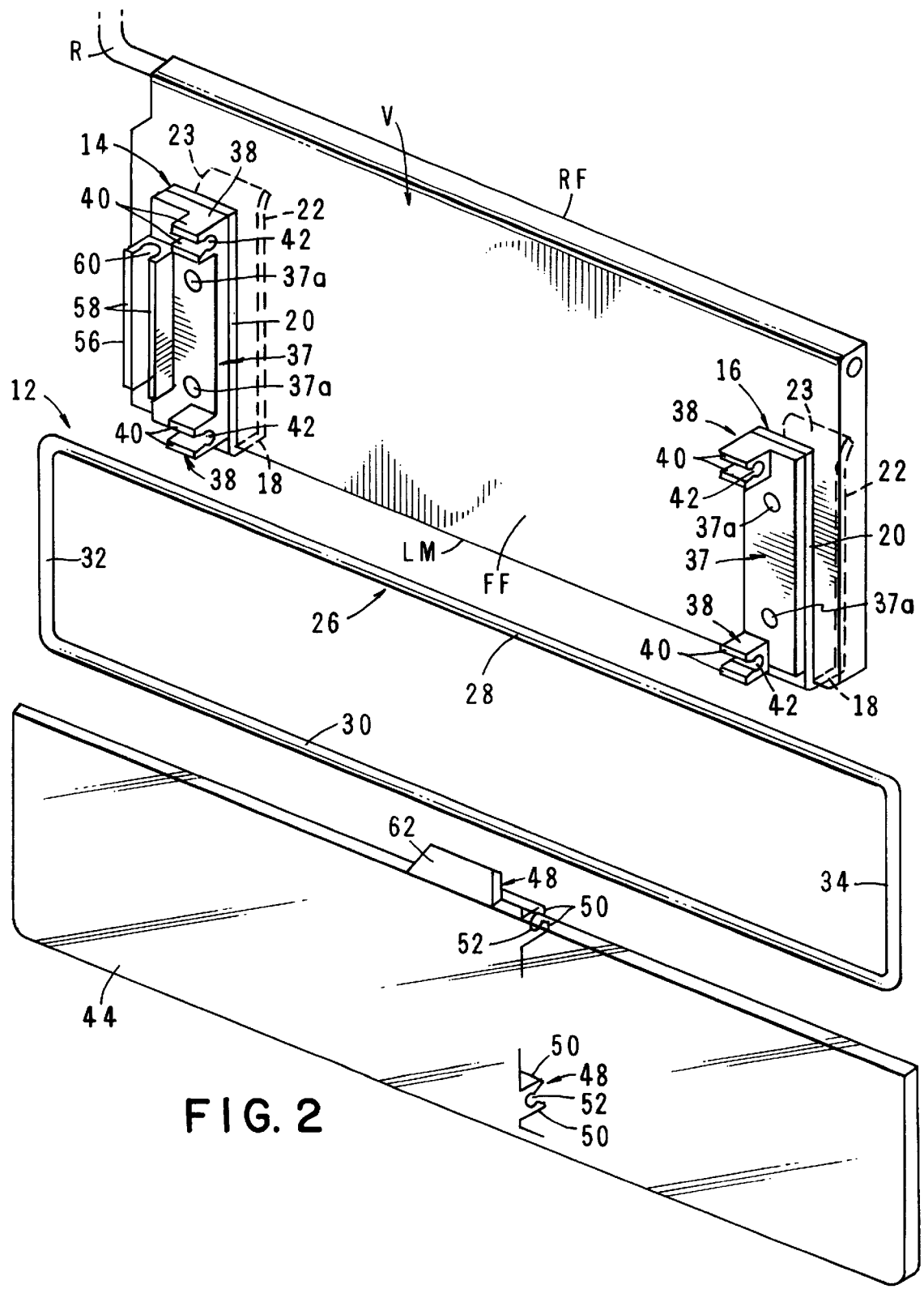
FIG. 2 is an exploded, generally perspective view of the sun visor attachment shown in FIG. 1.
Figure 4:
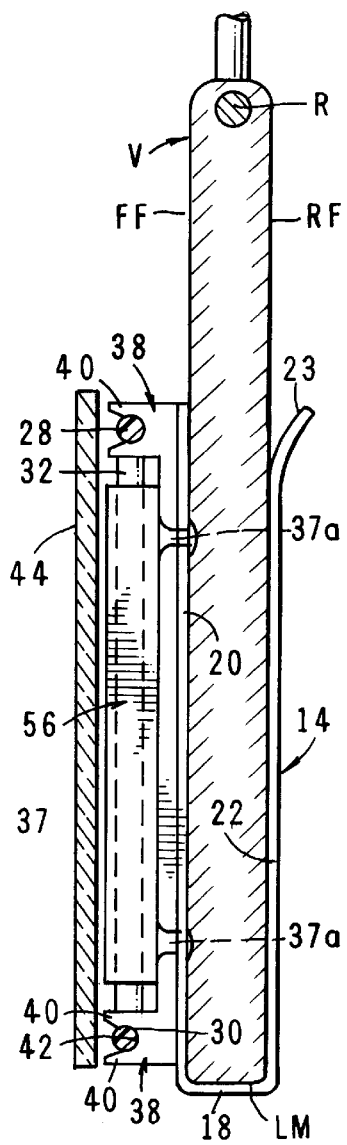
FIG. 4 is an enlarged cross-sectional view taken along lines 4—4 of FIG. 1.
Figure 5:
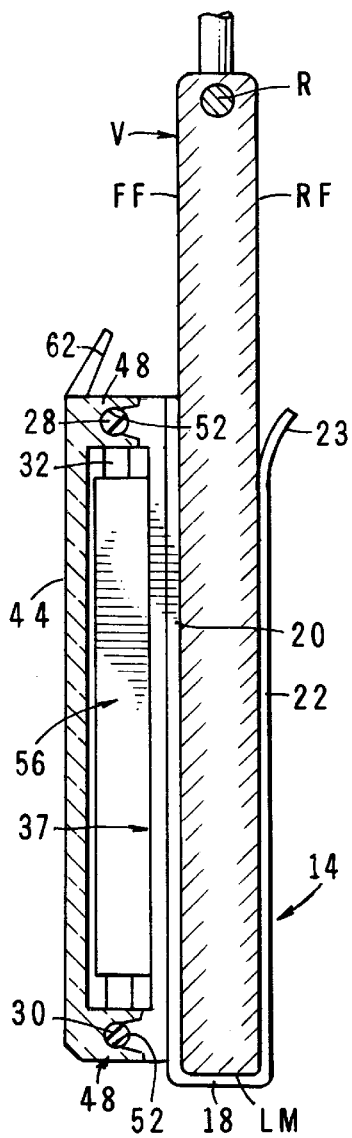
FIG. 5 is an enlarged, cross-sectional view taken along lines 5—5 of FIG. 1.
Figure 6:
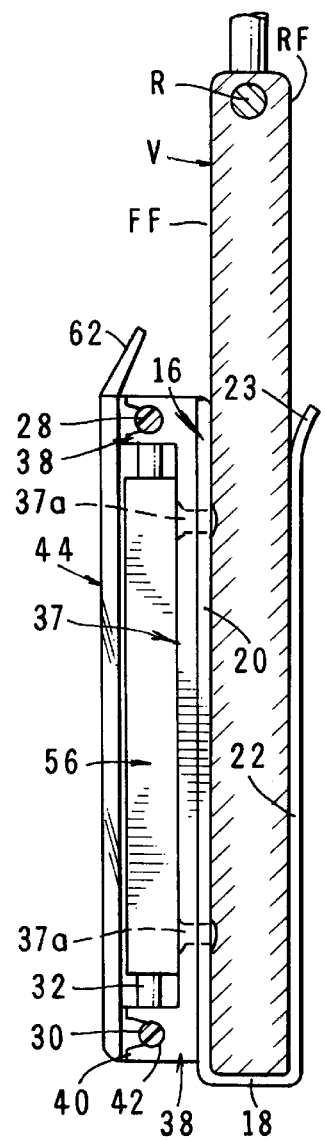
FIG. 6 is an enlarged, cross-sectional view taken along lines 6—6 of FIG. 1.

Referring particularly to FIG. 3, it can be seen that visor "V" has a front face "FF", a rear face "RF". As indicated in FIG. 2, each of the spring clips 14 and 16 includes a bight portion 18 and inwardly biased front and rear legs 20 and 22. Clips 14 and 16 can be constructed of spring steel or plastic and each is formed so that its opposing legs are yieldably biased inwardly toward one another. With this construction, when the clips are slipped over the lower margin "IM" of the visor, leg 20 frictionally engages the front face "FF" of the visor, while rear leg 22 frictionally engages the rear face RF of the visor. To assist in sliding the clips over the visor, the end portions 23 of each of the rear legs of the spring clips is bent outwardly as shown in FIGS. 4, 5, and 6. Because the legs of each clip are continuously biased toward one another, when the clips are slipped over the lower margin of the visor in the manner shown in FIGS. 4, 5, and 6, they will remain securely in position.

Also forming a part of the visor attachment of the invention is a support frame 26 which includes vertically spaced guides, shown here as first and second guide rods 28 and 30 and first and second end rods 32 and 34 which interconnect guide rods 28 and 30 to form the generally rectangularly shaped support frame 26 shown in FIG. 2. As will presently be discussed, rod 32 also forms a pivot rod for permitting pivotal movement of the glare shield of the invention into the position shown in FIG. 10.

Figure 11:
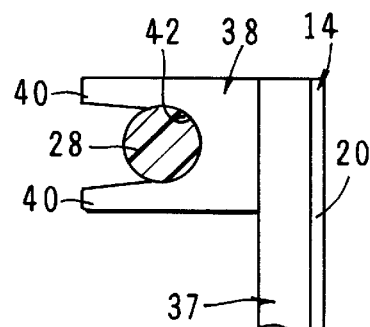
FIG. 11 is an enlarged, fragmentary, cross-sectional view of one of the guide rod receiving elements of one form of the invention.

Each of the first and second spring clips 14 and 16 includes connector means for removably connecting support frame 26 thereto. These connector means here comprise, for each spring clip 14 and 16, a support platform 37 which is connected to its respective spring clip by fasteners 37a. Formed on each support platform is a pair of vertically spaced-apart guide rod receiving means or rod connectors 38. Each rod connector 38 includes a pair of vertically spaced- apart, resiliently deformable, outwardly extending legs 40 which cooperate to define a generally key-hole shaped guide rod receiving socket 42 for gripping a selected one of the guide rods 28 and 30 (see also FIG. 11).

Forming an important aspect of the sun visor attachment of the invention is the previously mentioned, generally planar, tinted plastic glare shield 44 which is adapted to substantially block ultraviolet rays. Uniquely, glare shield 44 is both slidably and pivotally connected to support frame 26. More particularly, glare shield 44 is slidably movable from a first position shown in FIG. 3 to a second inward position shown in FIG. 8. The glare shield is also pivotally movable from a first upper position shown in FIG. 1 to a downward position, shown in FIG. 7. It is to be noted that when the glare shield is in the upward position shown in FIGS. 1 and 5, it resides in a plane generally parallel to and slightly spaced from front face "FF" of visor "V".

To enable sliding movement of glare shield 44 relative to guide rods 28 and 30, the glare shield 44 is provided with a pair of vertically spaced, generally centrally located guide rod sockets 48. Each guide rod socket comprises a pair of vertically spaced-apart, resiliently deformable, outwardly extending, legs 50 which cooperate to define a guide rod receiving socket 52. With this construction, when the glare shield is interconnected with guide rods 28 and 30 of frame 26, the glare shield can be slidably moved from the visor overlaying position shown in FIG. 1 to the inwardly extending position shown in FIG. 8 by exerting a force on the glare shield 44 tending to move it to the right as indicated by the arrow in FIG. 8. (See also the phantom lines in FIG. 7.)

Figure 9:
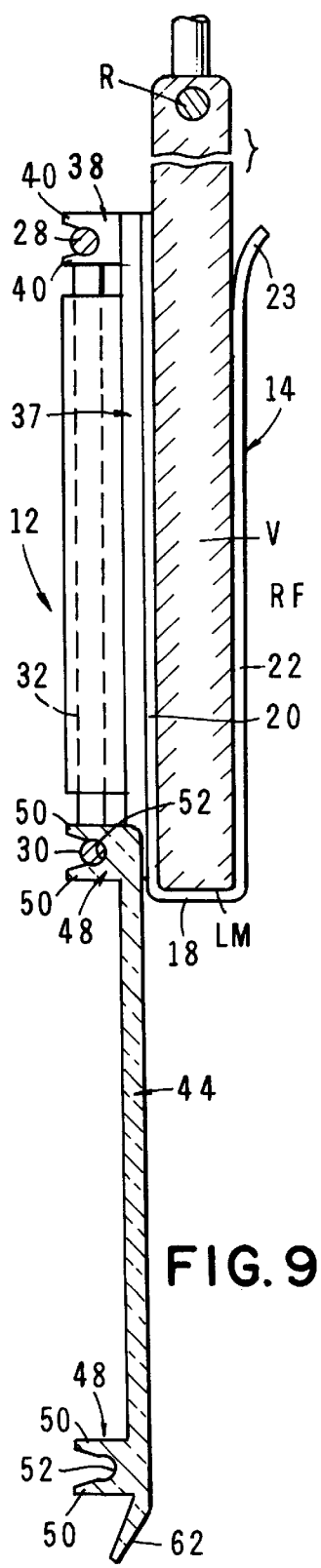
FIG. 9 is a cross-sectional view taken along lines 9—9 of FIG. 7.

As best seen by referring to FIG. 9, the lower of the guide rod sockets 48 also is designed to permit the pivotal movement of the glare shield 44 from the upward position shown in FIG. 1 to the downwardly extending position shown in FIG. 9 wherein the glare shield extends downwardly with respect to the vehicle visor "V".

Figure 10:
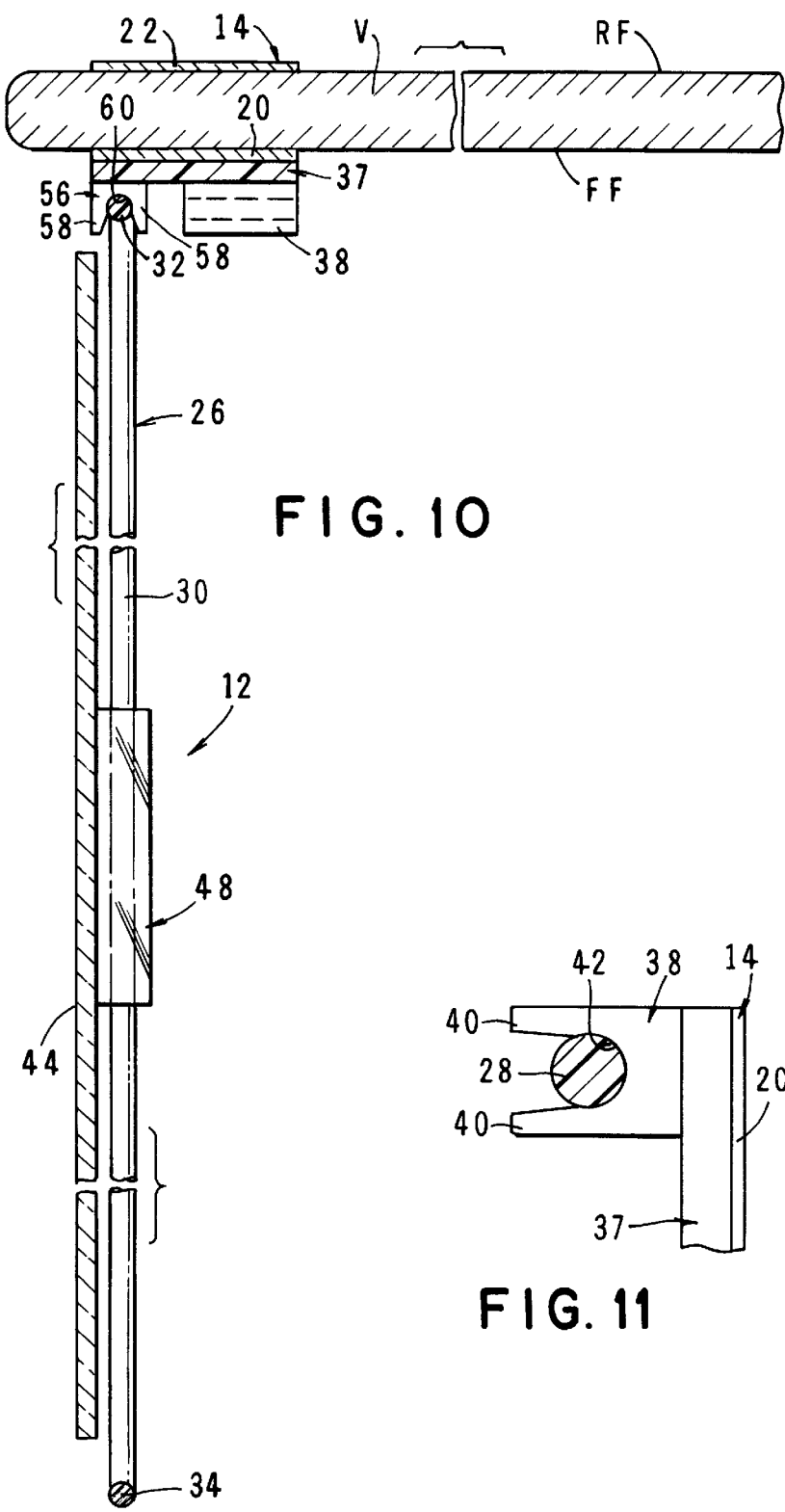
FIG. 10 is a top view showing the glare shield pivoted into a generally perpendicular position relative to the sun visor of the vehicle.

As previously mentioned, support frame 26 is pivotally movable relative to the visor shield between a first position shown in FIG. 5 wherein guide rods 28 and 30 are substantially parallel to the vehicle visor "V" to a second position shown in FIG. 10 wherein the guide rods of the support frame are in a plane substantially perpendicular to the plane of the sun visor "V". To permit this pivotal movement, platform 37, which is connected to first spring clip 14 includes, in addition to the guide rod receiving means 38, an end rod or pivot rod receiving means shown here as a generally key-hole shaped socket defining member 56. As best seen by referring to FIG. 10, socket defining member 56 extends outwardly from platform 37, which is affixed to spring clip 14, and includes two outwardly extending, space-apart legs 58 which define a pivot rod receiving socket 60 for receiving end rod or pivot rod 32 of frame 26.

In using the apparatus of the invention with the guide rod receiving means securely affixed to each of the spring clips 14 and 16, the assemblages thus formed are slipped over the lower edge of the visor "V" at spaced-apart locations in the manner shown in FIG. 2. This done, frame 26 is inserted into sockets 42 and into end rod socket 60 so that the frame 26 is securely supported by the spring clip assemblages. Next, the glare shield 44 is affixed to frame 26 by slipping key-hole socket defining members 48 over guide rods 28 and 30 respectively in the manner shown in FIG. 1.

Figure 8:
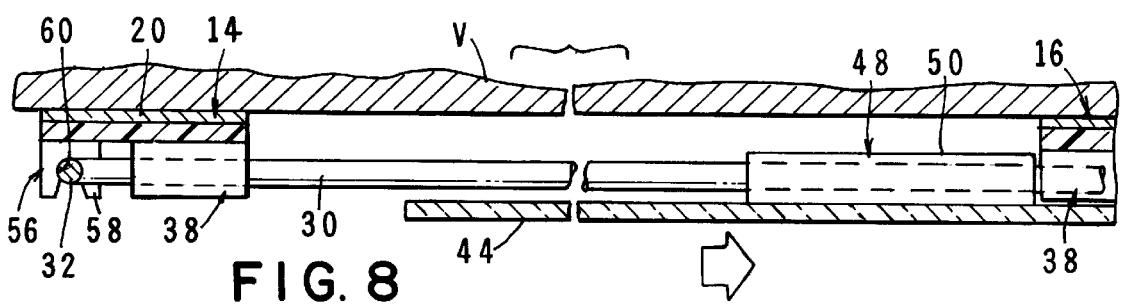
FIG. 8 is a fragmentary top view similar to FIG. 3 showing the glare shield being moved to the right relative to the sun visor.

With the apparatus assembled in the manner described in the preceding paragraphs, should it be necessary to slide the glare shield 44 toward to the center of the vehicle to block sun rays entering between the vehicle visors "V", the operator can grasp the finger engaging means or protuberance 62 which is formed on glare shield 44 and, by exerting a force in the direction of the arrow of FIG. 8, slidably move the glare shield to the right as viewed in FIG. 8. Similarly, should the operator wish to extend the effective length of the visor "V", protuberance 62 can be grasped with the fingers and an outward force exerted thereon. This outward force will cause the glare shield to pivot downwardly from the position shown in FIG. 5 to the position shown in FIG. 9 thereby effectively extending the length of the visor and blocking sun rays from entering through the windshield in a direction below the extent of the visor "V". In those situations where the sun rays are entering the vehicle through a side window, the operator can grip the edge of the glare shield and by exerting an outward force thereon, pivotally move the glare shield, along with frame 26 relative to pivot rod receiving means or key-hole socket-shaped member 56. When the assemblage is thus rotated in the direction of the arrow in FIG. 10 the assemblage will pivot from a position wherein the assemblage is substantially parallel to the visor "V" to the position shown in FIG. 10 where it is substantially perpendicular to the plane of the visor "V".

Figure 12:
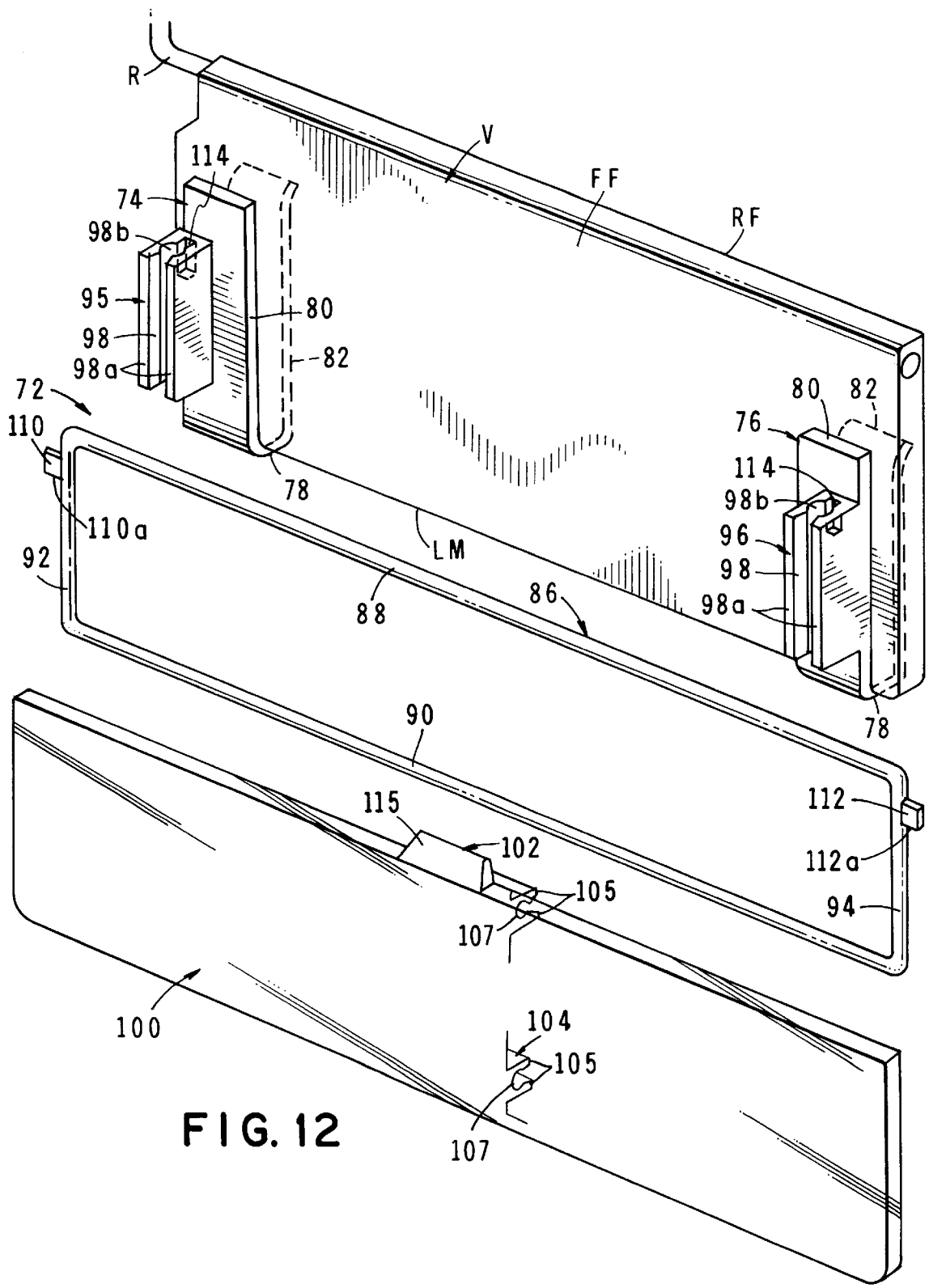
FIG. 12 is a generally perspective, exploded view of the alternate form of the invention.

Turning next to FIGS. 12 through 19, another form of the sun visor attachment of the present invention is there illustrated and generally identified by the numeral 72. In this latest embodiment of the invention, the attachment comprises an assembly made up of a pair of generally "U" shaped spring clips 74 and 76 which are removably receivable over the vehicle visor "V" at longitudinally spaced first and second locations. As shown in FIG. 12, visor "V" is supported by a support rod "R" which is affixed to the vehicle so that the visor can be pivotally moved upwardly and downwardly about the axis of rod "R".

Referring particularly to FIG. 14, it can be seen that, as before, visor "V" has a front face "FF", a rear face "RF". As indicated in FIG. 12, each of the spring clips 74 and 76 includes a bight portion 78 and inwardly biased front and rear legs 80 and 82. Clips 74 and 76 can be constructed of spring steel or plastic and each is formed so that its opposing legs are yieldably biased inwardly toward one another. With this construction, when the clips are slipped over the lower margin "LM" of the visor, leg 80 frictionally engages the front face "FF" of the visor, while rear leg 82 frictionally engages the rear face RF of the visor. As before, to assist in sliding the clips over the visor, the end portions of each of the rear legs of the spring clips is bent outwardly as shown in FIG. 12. Because the legs of each clip are continuously biased toward one another, when the clips are slipped over the lower margin of the visor in the manner shown, they will remain securely in position.

Also forming a part of the visor attachment of this alternate form of the invention is a support frame 86 which includes vertically spaced guides, shown here as first and second guide rods 88 and 90 and first and second end rods 92 and 94 which interconnect guide rods 88 and 90 to form the generally rectangularly shaped support frame 86 shown in FIG. 12. As will presently be discussed, rod 90 also forms a pivot rod for permitting pivotal movement of the glare shield of this latest form of the invention into the position shown in FIG. 20.

Each of the first and second spring clips 74 and 76 includes connector means for removably connecting support frame 26 thereto. These connector means here comprise a support platform 94 and 96 for each spring clip 74 and 76 respectively, which support platforms are appropriately connected to their respective spring clip by adhesive bonding or the like. Formed on each support platform is a pair of vertically spaced-apart guide rod receiving means or rod connectors 98. Each rod connector 98 includes a pair of vertically spaced- apart, resiliently deformable, outwardly extending legs 98a which cooperate to define a generally key-hole shaped guide rod receiving socket 98b for gripping a selected one of the guide rods 92 and 94.

Forming an important aspect of the sun visor attachment of the invention is the previously mentioned, generally planar, tinted plastic glare shield 100 which is adapted to substantially block ultraviolet rays. As before, glare shield 100 is connected to support frame 86 for both slidable and pivotal movement with respect thereto. More particularly, glare shield 100 is slidably movable from a first position shown in FIG. 20 to a second inward position shown by the phantom lines in FIG. 20. The glare shield is also pivotally movable from a first upper position shown in FIG. 13 to a downward position shown in FIG. 20. It is to be noted that when the glare shield is in the upward position shown in FIGS. 13 and 14, it resides in a plane generally parallel to and slightly spaced from front face "FF" of visor "V".

To enable sliding movement of glare shield 44 relative to guide rods 88 and 90, the glare shield 100 is provided with a pair of vertically spaced, generally centrally located first and second guide rod sockets 102 and 104 respectively. Each guide rod socket comprises a pair of vertically spaced-apart, resiliently deformable, outwardly extending, legs 105 which cooperate to define a guide rod receiving socket 107. With this construction, when the glare shield is interconnected with guide rods 88 and 90 of frame 86, the glare shield can be slidably moved from the visor overlaying position shown in FIG. 13 to the inwardly extending position shown by the phantom lines in FIG. 20 by exerting a force on glare shield 100 tending to move it to the right as indicated by the arrow 109 in FIG. 20.

As best seen by referring to FIG. 20, the lower of the guide rod sockets 107 also is designed to permit the pivotal movement of the glare shield 100 from the upward position shown in FIG. 13 to the downwardly extending position shown in FIG. 20 wherein the glare shield extends downwardly with respect to the vehicle visor "V".

In this latest form of the invention, support frame 86 is also pivotally movable relative to the visor shield between a first position shown in FIG. 14 wherein guide rods 88 and 90 are substantially parallel to the vehicle visor "V" to a second position shown in FIG. 15 wherein the guide rods of the support frame are in a plane substantially perpendicular to the plane of the sun visor "V". To permit this pivotal movement in the earlier-described embodiment shown in FIGS. 1 through 11, it was necessary that the first spring clip 14 include, in addition to the guide rod receiving means 38, an end rod or pivot rod receiving means in the form of a generally key-hole shaped socket defining member 56. In this latest form of the invention shown in FIGS. 12 through 20, the socket defining member 56 is not required. More particularly, because of the novel design of platforms 74 and 76, the support frame 86 can be conveniently pivoted about sockets 98b into a generally perpendicular relationship with the visor "V". It is also be observed that because of the novel design of clip assemblages 74 and 76, the clips can be used in conjunction with either the driver side or passenger side and frame 86 can be pivoted out of plane with visor "V" using either platform assemblage 74 or 76. This novel feature permits the same apparatus to be used in both the driver side and passenger side of the vehicle and permits pivotal movement of the glare shield to a position proximate both the driver side window (see FIG. 15) and the passenger side window (see FIG. 19).

As best seen in FIGS. 15 through 10, locking means are provided on frame 86 for locking the support frame in the outwardly extending positions shown in FIGS. 15 and 19. These locking means here comprise locking tabs 110 and 112 provided on end rods 92 and 94 respectively of support frame 86. As indicated in FIG. 17, the locking tabs are slidably receivable by force of gravity into slot-like openings 114 provided in support platforms 94 and 96. When the supporting frame is pivoted outwardly with respect to visor "V" into the substantially perpendicular relationship there-with shown in FIG. 15 and 19. More particularly, when frame 86 is in other than a perpendicular relationship with visor "V", the lower edge 110a and 112a of tabs 110 and 112 ride along the upper surfaces of support platforms 94 and 96. However, as best seen in FIG. 17, as the frame 86 is pivoted from the position shown in FIG. 13 to the position shown in FIGS. 15 and 17, the lower surface 110a of tab 110 will ride along the upper surface of platform 96 from the position shown in the phantom lines of FIG. 16 to the position shown by the solid lines. When the frame reaches the vertical orientation shown in FIGS. 15 and 17, tab 110 will move by force of gravity into a downward, locked position in which tab 110 resides within the slot like opening 114 formed in support platform 94. By lifting up on frame 86 until tab 110 clears the top surface of support platform 94, the frame can be pivoted to the starting position proximate visor "V". In a similar manner, frame 86 can be pivoted relative to support platform 76, into a locked position, as for example, proximate the passenger side window.

In using this latest form of the apparatus of the invention, clip assemblages 74 and 76 can be slipped over the lower edges of either or both the driver and passenger side visors "V" at spaced-apart locations. This done, frame 86 is inserted into sockets 92 of platforms 74 and 76 so that the frame 86 is securely supported by the spring clip assemblages. Next, the glare shield 100 is affixed to frame 86 by slipping key-hole socket defining members 102 and 104 over guide rods 88 and 90 respectively. With the apparatus thusly assembled, should it be necessary to slide the glare shield 100 toward to the center of the vehicle to block sun rays entering between the vehicle visors "V", the operator can grasp the finger engaging means or protuberance 115 which is form ed on glare shield 100 and, by exerting a force in the direction of the center of the vehicle, slidably move the glare shield to the desired inward position. Similarly, should the operator wish to extend the effective length of the visor "V", protuberance 115 can be grasped with the fingers and an outward force exerted thereon. This outward force will cause the glare shield to pivot downwardly from the position shown in FIG. 13 to the position shown in FIG. 20 thereby effectively extending the length of the visor and blocking sun rays from entering through the windshield in a direction below the extent of the visor "V". In those situations where the sun rays are entering the vehicle through the side windows, the operator can grip the edge of the glare shield and by exerting an outward force thereon, pivotally move the glare shield, along with frame 86 relative to platforms 74 and 76 as appropriate in the manner previously described to block the sun ray entering either the driver or passenger side windows.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An attachment for a vehicle sun visor comprising:
   (a) first and second spaced-apart guides;
   (b) a pivot rod interconnecting said first and second spaced-apart guides;
   (c) a first spring clip assembly interconnectable with the vehicle sun visor at a first location, said first spring clip assembly including connector means for connecting said first and second guides thereto and further comprising a connector having a pair of resiliently deformable, outwardly extending legs which cooperate to define a receiving socket for gripping engagement with said pivot rod to permit pivotal movement of said spaced-apart guides between a first location proximate the vehicle sun visor to a second location substantially perpendicular to said vehicle sun visor;
   (d) a second spring clip assembly interconnectable with the vehicle sun visor at a second location, said second spring clip assembly including connector means for connecting said first and second guides thereto; and
   (e) a glare shield slidably interconnectable with said first and second guides for sliding movement relative thereto between first and second positions.

2. An attachment as defined in claim 1 in which said glare shield is pivotally connected to one of said first and second guides for movement between a first upper location overlaying the vehicle sun visor and a second lower location wherein said glare shield extends downwardly from the vehicle sun visor.

3. An attachment as defined in claim 1 in which said pivot rod includes locking means for locking said guide rods in said second location.

4. An attachment for a vehicle sun visor comprising:
   (a) first and second spaced-apart guide rods;
   (b) a first, generally "U" shaped spring clip assembly interconnectable with the vehicle sun visor at a first location, said first spring clip assembly including first and second guide rod receiving means for releasably connecting said first and second guide rods thereto;
   (c) a second spring clip assembly interconnectable with the vehicle sun visor at a second location, said second spring clip assembly including first and second guide rod receiving means for removably connecting said first and second guide rods thereto; and
   (d) a glare shield slidably interconnectable with said first and second guide rods for sliding movement relative thereto between a first visor overlaying position and a second extended position.

5. An attachment as defined in claim 4 in which said glare shield is connected to said second guide rod receiving means for pivotal movement with respect thereto between a first upper location overlaying the vehicle sun visor and a second lower location wherein said glare shield extends downwardly from the vehicle sun visor.

6. An attachment as defined in claim 5 further including a pivot rod interconnecting said first and second spaced-apart guide rods, said first spring clip assembly including pivot rod receiving means for receiving said pivot rod in a manner to permit movement of said spaced-apart guide rods between a first position wherein said guide rods extend substantially parallel to the vehicle visor to a second position wherein said guide rods extend substantially perpendicular to the vehicle sun visor.

7. An attachment as defined in claim 6 in which said guide rod receiving means of said first and second spring clip assemblies comprises a pair of connectors, each said connector having a pair of vertically spaced-apart, resiliently deformable, outwardly extending legs which cooperate to define a generally keyhole shaped receiving socket.

8. An attachment for a vehicle sun visor comprising:
   (a) a support frame comprising first and second vertically spaced-apart guide rods and first and second longitudinally spaced apart end rods;
   (b) a first spring clip assembly comprising a generally "U" shaped spring clip interconnectable with the vehicle sun visor at a first location, said first spring clip assembly including a pair of vertically spaced-apart guide rod receiving sockets for removably connecting said guide rods thereto, said first spring clip assembly also including an end rod receiving means for receiving said first end rod of said support frame;

(c) a second spring clip assembly comprising a generally "U" shaped spring clip interconnectable with the vehicle sun visor at a second location, said second spring clip assembly including a pair of vertically spaced-apart guide rod receiving sockets for removably connecting said guide rods thereto; and (d) a glare shield slidably connected to said first and second guide rods of said support frame for sliding movement relative thereto between first and second positions.

9. An attachment as defined in claim 8 in which said support frame is pivotally connected to said first and second spring clip assemblies for movement between a first upper location overlaying the vehicle sun visor and a second lower location wherein said glare shield extends downwardly from the vehicle sun visor.

10. An attachment as defined in claim 8 in which said first end rod of said support frame is pivotally connected to said end rod receiving means of said first spring clip assembly to permit movement of said support frame between a first position wherein said guide rods are substantially parallel to the vehicle visor to a second position wherein said guide rods of said support frame are substantially perpendicular to the vehicle sun visor.

11. An attachment as defined in claim 8 in which said end rod receiving means of said first spring clip assembly includes a generally key-hole shaped socket for removably receiving said first end rod of said support frame.

12. An attachment as defined in claim 8 in which each of said generally "U" shaped spring clips comprises a pair of spaced-apart, inwardly biased visor engaging legs for frictionally engaging the vehicle visor when said vehicle visor is disposed between said visor engaging legs.

13. An attachment as defined in claim 8 in which said glare shield includes a pair of vertically spaced, generally centrally located guide rod sockets for slidably receiving said guide rods of said support frame.

14. An attachment as defined in claim 13 in which said glare shield further includes a centrally disposed, upwardly extending finger gripping protuberance for gripping said glare shield to effect movement thereof.

15. An attachment as defined in claim 13 in which said glare shield comprises a generally planar sheet of tinted plastic material adapted to substantially block ultraviolet rays.

16. An attachment for a vehicle sun visor comprising:

(a) first and second spaced-apart guides;

(b) a pivot rod interconnecting said first and second spaced-apart guides;

(c) a first spring clip assembly interconnectable with the vehicle sun visor at a first location, said first spring clip assembly including:

(i) connector means for connecting said first and second guides thereto; and (ii) pivot rod connection means for receiving said pivot rod in a manner to permit movement of said spaced-apart guides between a first position wherein said guides are substantially parallel to the vehicle sun visor and a second position wherein said guides are substantially perpendicular to the vehicle sun visor;

(d) a second spring clip assembly interconnectable with the vehicle sun visor at a second location, said second spring clip assembly including connector means for connecting said first and second guides thereto; and (e) a glare shield slidably interconnectable with said first and second guides for sliding movement relative thereto between first and second positions.

17. An attachment as defined in claim 16 in which said first and second spring clips each comprise a generally "U" shaped member having spaced apart visor engaging legs, said legs being biased toward one another to frictionally engage the vehicle visor when said spring clips are interconnected with the vehicle visor.

* * * * *